United States Patent
Hurst et al.

(10) Patent No.: US 9,019,420 B2
(45) Date of Patent: Apr. 28, 2015

(54) IMAGE REDIRECTION SYSTEM FOR MOBILE DEVICES

(71) Applicant: COVR LLC, Bellevue, WA (US)

(72) Inventors: Thomas J. Hurst, Bellevue, WA (US); Stephen T. Vincent, Kirkland, WA (US)

(73) Assignee: COVR LLC, Bellevue, WA (US)

( * ) Notice: Subject to any disclaimer, the term of this patent is extended or adjusted under 35 U.S.C. 154(b) by 0 days.

(21) Appl. No.: 14/081,710

(22) Filed: Nov. 15, 2013

(65) Prior Publication Data

US 2014/0171150 A1 Jun. 19, 2014

Related U.S. Application Data

(60) Provisional application No. 61/739,626, filed on Dec. 19, 2012.

(51) Int. Cl.
*H04N 9/07* (2006.01)
*H04M 1/02* (2006.01)
*H04M 1/04* (2006.01)

(52) U.S. Cl.
CPC ............. *H04M 1/0264* (2013.01); *H04M 1/04* (2013.01)

(58) Field of Classification Search
None
See application file for complete search history.

(56) References Cited

U.S. PATENT DOCUMENTS

| | | | |
|---|---|---|---|
| 3,833,291 A | 9/1974 | Samuelson | |
| 4,162,838 A | 7/1979 | Allen | |
| 5,541,686 A | 7/1996 | Stephenson | |
| 7,271,845 B2 | 9/2007 | Aoyama et al. | |
| 7,925,151 B2 * | 4/2011 | Kobre | 396/174 |
| 7,967,513 B2 | 6/2011 | Zhang | |
| 8,279,544 B1 | 10/2012 | O'Neill | |
| 2007/0116454 A1 | 5/2007 | Tsai | |
| 2007/0280677 A1 | 12/2007 | Drake et al. | |
| 2010/0328420 A1 | 12/2010 | Roman | |
| 2011/0043683 A1 * | 2/2011 | Beach et al. | 348/373 |
| 2012/0018322 A1 | 1/2012 | Mongan et al. | |
| 2013/0011127 A1 | 1/2013 | Lawton | |
| 2013/0083185 A1 | 4/2013 | Coleman, III | |
| 2013/0329115 A1 * | 12/2013 | Palmeri | 348/335 |

FOREIGN PATENT DOCUMENTS

| | | |
|---|---|---|
| JP | 2002-27292 A | 1/2002 |
| KR | 10-1149925 B1 | 5/2012 |
| WO | 2011/098760 A1 | 8/2011 |

\* cited by examiner

*Primary Examiner* — Twyler Haskins
*Assistant Examiner* — Angel L Garces-Rivera
(74) *Attorney, Agent, or Firm* — Seed IP Law Group PLLC (57) ABSTRACT

An image redirection system having a case that includes a body configured to removably attach to a mobile device, and an optical housing on the body, the optical housing configured to position one or more optical elements over the mobile device lens and flash unit when the case is attached to the mobile device. The optical housing is configured to enable one-handed operation such that a user can deploy and retract the optical housing with only one digit of a hand that holds the case and enable operation of the camera with another finger or thumb of the holding hand.

31 Claims, 12 Drawing Sheets

IMAGE REDIRECTION SYSTEM FOR MOBILE DEVICES

BACKGROUND

1. Technical Field

The present disclosure relates to an optical lens system for a camera residing in a portable electronic device and, more particularly, to a case for the portable electronic device with a field of view redirecting system having a redirecting device and deployment mechanism to position the redirecting device over a lens of the camera, including one-handed operational capability.

2. Description of the Related Art

Mobile devices with built-in cameras have become common and very popular for taking photos and videos. Examples of devices with built-in cameras include, without limitation, mobile telephone, smart phones, tablet computers, netbook computers, laptop computers, video recorders, and portable cameras. A viewing screen is typically provided to enable a user to view the scene to be photographed as well as to view the resulting image capture of the scene.

Using mobile devices with viewing screens requires the device to be held in an orientation that enables the user to see the screen and to manipulate text and command keys while viewing the screen (referred to as the normal viewing orientation). In order to use most mobile devices with embedded cameras to take photos or videos, the user must rotate the device from the normal viewing orientation and hold the device perpendicular to their line of sight for proper viewing of the image. Using the device in this orientation requires the user to grip the device on its edges, often requiring two hands to stabilize the device during recording of the photograph or video. The user has less control of the mobile device in this orientation because the device is only held on its edges. Additionally, opportunities for photographs or videos are often missed because it can be too awkward to set down any items the user may be holding to use two hands to take a picture with the mobile device. Often images or video are captured in real time when subjects are interacting at events, parties, and celebrations where so often there is food or drinks being served, and it is much more difficult to set down items like programs, plates, drinks, and coats in order to capture an image with two hands.

The requirement to hold the mobile device in a position perpendicular with the user's line of sight is also problematic because it makes it more obvious that image capture is occurring. This reduces the possibility of candid or stealth image capture of people in a natural environment or poses. Photojournalists or documentary photographers and videographers build their reputations and careers on the ability to capture people and life in a non-obtrusive manner. This is exceedingly more difficult to do when people hold their mobile devices in a vertical or horizontal direction that is required if one is going to capture a picture or video.

There are a number of add-on lens accessories available that attach to mobile devices to provide features like wide angle viewing, fish-eye viewing, telephoto viewing, and even right angle image capture. There are several problems with these types of add-on lenses. First, they are relatively large and do not allow the mobile device to be easily stored with the lens in place, requiring the lens to be removed and transported separately from the mobile device. If these lens accessories are not removed from the mobile device during storage or transport, the lens protrudes from the device so far that it is prone to damage. Second, transporting the lens separately from the mobile device requires the user to locate and install the lens in order to use it. This action delays the use of the lens and makes it much less beneficial.

Accordingly, there is a need and a desire for a simple, small and inexpensive lens design that incorporates general optics design principles for field of view redirection that is small enough to remain attached to the mobile device during use, transport, and storage, and that addresses the need for one-handed operation.

BRIEF SUMMARY

The present disclosure is directed to an image redirection system on a case configured to be removably attached to a mobile device having a camera and associated lens in which the redirection system redirects the light to the mobile device camera lens. Preferably the system is configured to enable one-handed operation in an unencumbering manner to the user.

In accordance with one aspect of the present disclosure, a case is provided that includes a body configured to removably attach to the mobile device; and an optical housing on the body, the optical housing configured to position one or more optical elements over the mobile device camera lens when the case is attached to the mobile device. Preferably, the optical housing further includes a projection configured to enable a user to manipulate the camera of the mobile device and the optical housing with only one digit of a hand that holds the case.

In accordance with another aspect of the present disclosure, an apparatus is provided that includes a body configured to removably attach to the mobile device; a contoured housing on the body, the contoured housing having side walls and a top wall coupled to the side walls, the contoured housing configured to allow light to pass from an exterior of the apparatus to the lens, the top wall of the contoured housing configured to receive a digit on a user's hand to enable a user to brace the body against the user's hand and manually manipulate the house, thus facilitating one-handed operation; and an optical element configured to be received by, and preferably enclosed by, the contoured housing and to redirect light from the exterior of the contoured housing to the lens of the mobile device.

In accordance with a further aspect of the present disclosure, a system is provided that includes a case having a body configured to removably attach to the mobile device; at least one or more optical elements; and an optical housing on the body, the optical housing configured to position the at least one or more optical elements over the mobile device lens when the case is attached to the mobile device. Ideally, the optical housing further comprises a projection configured to enable a user to manipulate the camera of the mobile device and the optical element with only one digit of a hand that holds the case.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with mobile devices, camera lenses, and flash units for the same have not been shown or described in order to avoid unnecessarily obscuring descriptions of the embodiments.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
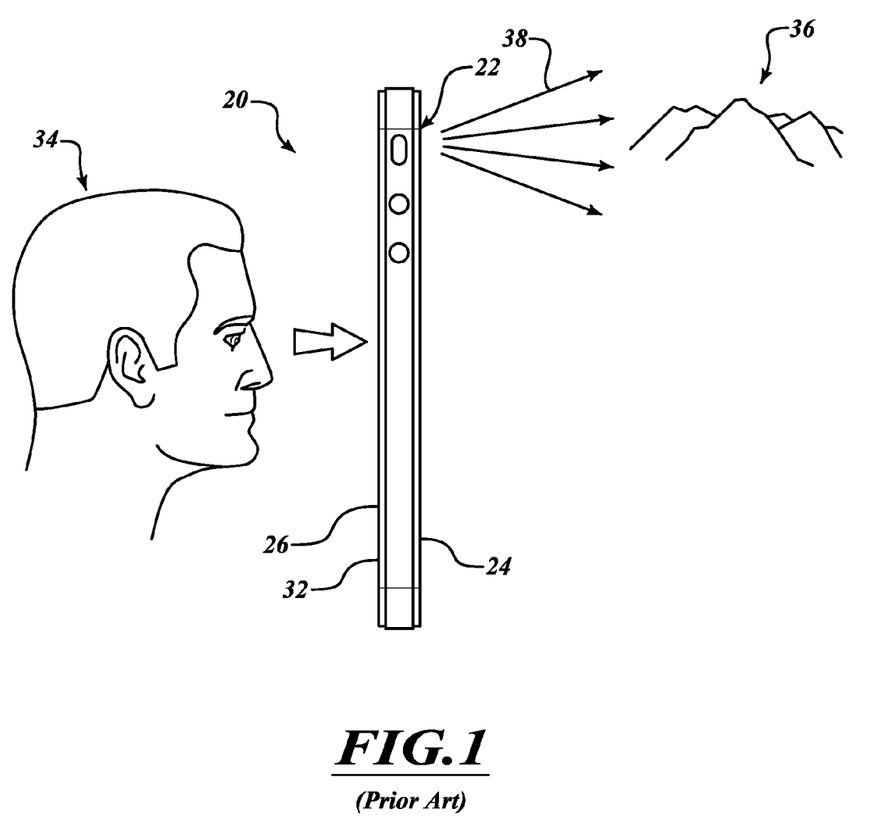
FIG. 1 is a side plan view depicting the line of sight between a user and an orientation of a mobile phone for photo and video recording.

Referring initially to FIG. 1, shown therein is a typical mobile device 20 that is configured to capture images of a remote object 36. The device 20 has a front side 24, a rear user-interface side 26, and the device may be configured as a smart phone, a tablet or a laptop having a built-in camera 22 with an associated lens 28 and a flash unit 30 on the front side 26 (seen more clearly in FIG. 8). The lens 28 is typically has a field of view 38 shown with radiating arrows 38 out of the front side 24 and is designed to admit external light into the camera sensor through an aperture in the lens 28. The flash unit 30 is also positioned on the front side 24, usually adjacent the lens 28, and is configured to provide a flash of light in order to illuminate the object 36. Some mobile phones and devices include a camera lens on the user interface side. This enables the user's image to be captured for still and video imaging purposes.

Figure 2:
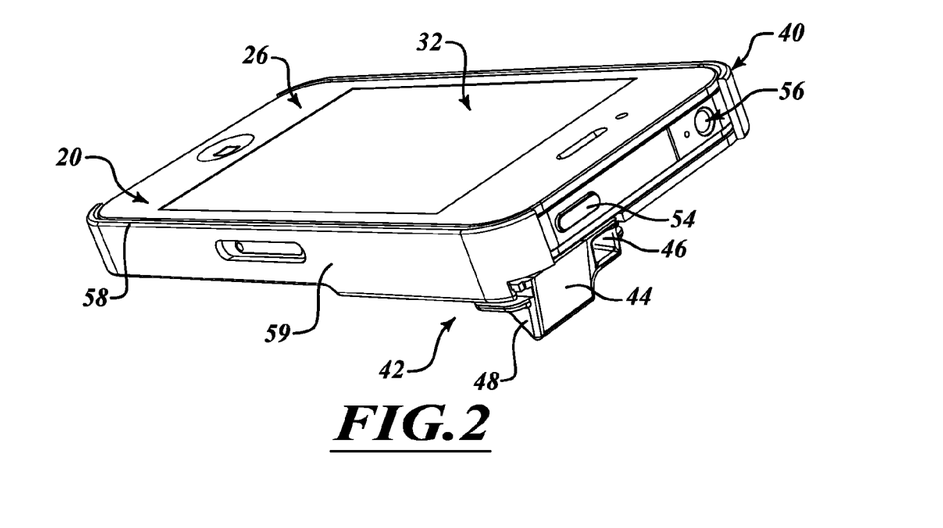
FIG. 2 is an isometric view depicting a first embodiment of the image redirection system with a mobile device formed in accordance with the present disclosure.
Figure 3:
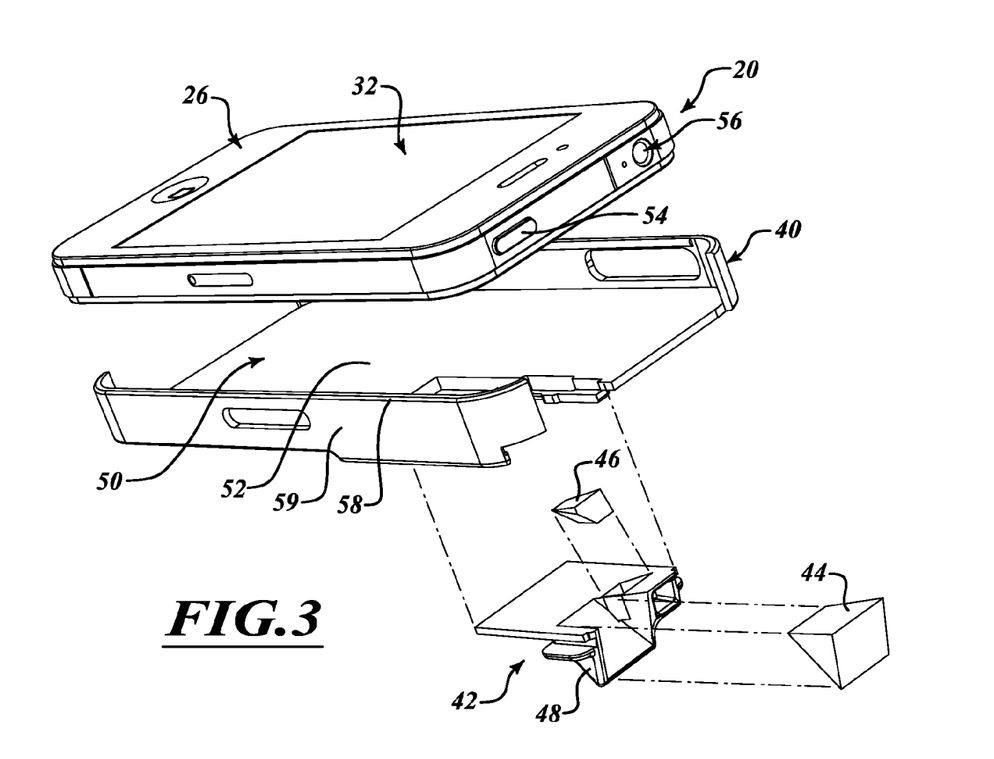
FIG. 3 is an exploded isometric view depicting the system of FIG. 2.

As shown more clearly in FIGS. 2-3 in which an embodiment of the present disclosure is shown, the user interface side 26 generally has a touch screen 32 through which the user 34 enters commands, sends and reads messages, views images of scenes prior to and after image capture, and controls operation of the camera 22. The user 34 will usually hold the device 20 in a vertical orientation to keep the field of view 38 directed towards and covering at least part of the scene or object 36 of interest while keeping the screen 32 facing the user 34.

The known device 20 is usually cuboidal with rounded edges but comes in a variety of shapes. For example, the device 20 may not be planar (e.g., have a curvature), may not be symmetrical along the length or the width, or may consist of two or more bodies slidably engaged or connected with a hinge. The user 34 may interact with the device 20 through the touch screen 32, through one or more buttons on the exterior of the device 20, or through both the buttons and the touch screen 32. The screen may also have multiple touch screens or the touch screen can be partitioned into multiple screens. The external buttons for the device 20 may be used to control a power state of the device, control volume of an audible media, signal an ASCII character input, or provide any number of controlling or signaling functions. The device 20 may also connect to other devices like a computer, a router, or a power supply through input or output ports or through wireless transmission systems.

While the lens 28 may be located in any number of places on the device 20, it is typically positioned at the top left corner of the front side 24 as shown in FIGS. 2 and 3. In alternative embodiments the lens 28 may be located anywhere on the body of the device 20, including the top center of the front side 24, the center of the front side 24, the top of the user interface side 26, or on any side of any body for a hinged body device. The flash unit 30 may also be located anywhere on the body of the device 20, but in the preferred embodiment is co-located next to the lens 28.

The lens 28 is configured to provide an optical focus of light reflected from images of scenes or objects 36. The images captured through the lens 28 may be obtained as static pictures, a string of pictures in burst mode, or video capture with various frame rates. The lens 28 determines the field of view 38 that the built-in camera 22 may image, a depth of focus, and the clarity of the resulting image. The flash unit 30 is used to provide additional illumination of the scene or object 36 in less than optimal light conditions according to the specifications of the camera 22, which is well known and will not be described in more detail herein.

As shown in FIGS. 2 and 3, a detachable mobile device case 40 with a lens redirecting system 42 formed in accordance with one aspect of the present disclosure is shown. FIG. 2 depicts the case 40 attached to the device 20 and FIG. 3 depicts an exploded view with the case 40 removed from the device 20. The case 40 is usually cuboidal with rounded edges but comes in a variety of shapes to match with and engage the exterior of the device 20 with a close fit. For example, the case 40 may have a curvature, may not be symmetrical along the length or the width, or may consist of two or more bodies, possibly connected with a hinge. In a preferred embodiment, the case 40 substantially corresponds to the shape of the device 20 and is sized so as to manually snap on and off the device 20, or it may consist of two or more pieces that fasten together once installed on the mobile device 20.

The case 40 has an opening 50 on the front side and a backing 52 on the opposing side. The perimeter of the opening 50 is defined by a lip 58. The sides 59 of the case 40 join the lip 58 to the backing 52. The sides 59, the lip 58 or the backing 52 may have one or more openings in their respective surface, including openings to accommodate device buttons 54 and input/output ports 56 on the device 20.

The image redirecting system 42 protrudes from the backing 52 and away from the case 40 and is configured to cover or enclose the lens 28 and flash unit 30 when deployed during use. The image redirecting system 42 may extend the entire width or length of the case 40 or may be smaller in length, width, or both. The height of the lens redirecting system 42 from the backing 52 is minimized, but sufficiently sized to enclose a lens optical element 44 and a flash optical element 46 within a housing 48. Ideally the height is in the range of 8-14 mm. The optical elements 44, 46 provide a means to redirect light or change the angle of light passing through the optical elements 44, 46, such as changing the angle of the light relative to the surface of the camera lens 28 and the flash unit 30 surface. The optical elements 44, 46 may be in the form of one or more prisms, lenses, mirrors or a light pipe to accomplish the light redirection, as described more fully below with respect to FIGS. 11-12. The change in angle of the light passing through the optical elements is typically between 1 and 90 degrees.

In one embodiment the change in light angle is fixed and in a second embodiment the change in light angle is dynamic either through one or more configurable optical elements or interchangeable optical elements. The optical elements are optically isolated from one another in the housing 48, such as with an opaque physical wall, to prevent light bleed from the flash unit 30 to the lens 28. Optical isolation may be accomplished with other known forms of light barriers.

Figure 4:
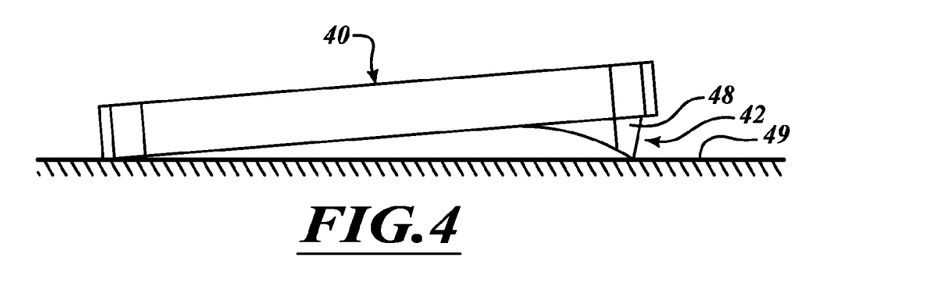
FIG. 4 is a side plan view depicting the system of FIG. 2 with the mobile device resting on a horizontal surface.

As shown in FIG. 4, the housing 48 is sized and shaped to support the one end of the case 40 on a supporting surface 49 in a "hands free" operating mode. As such, the camera lens and flash are pointed upward at an angle from the supporting surface 49. This angle may be in the range of 1 degree to 20 degrees, and allows the lens and flash to perform their function without interference from the supporting surface 49, such as from reflection of light.

Figure 5:
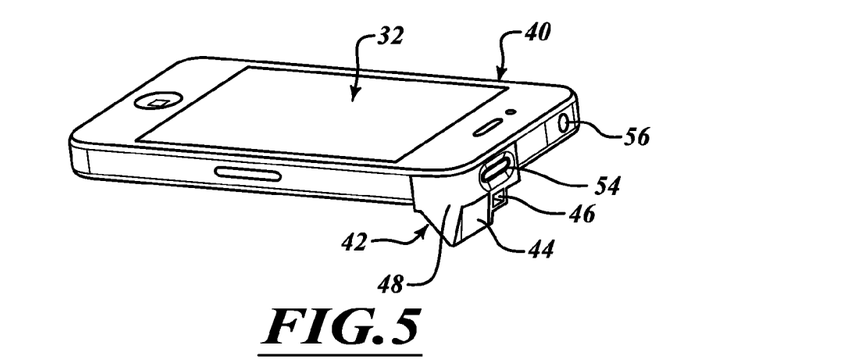
FIG. 5 is an isometric view depicting a second embodiment of an image redirection system with a mobile device formed in accordance with the present disclosure.
Figure 6:
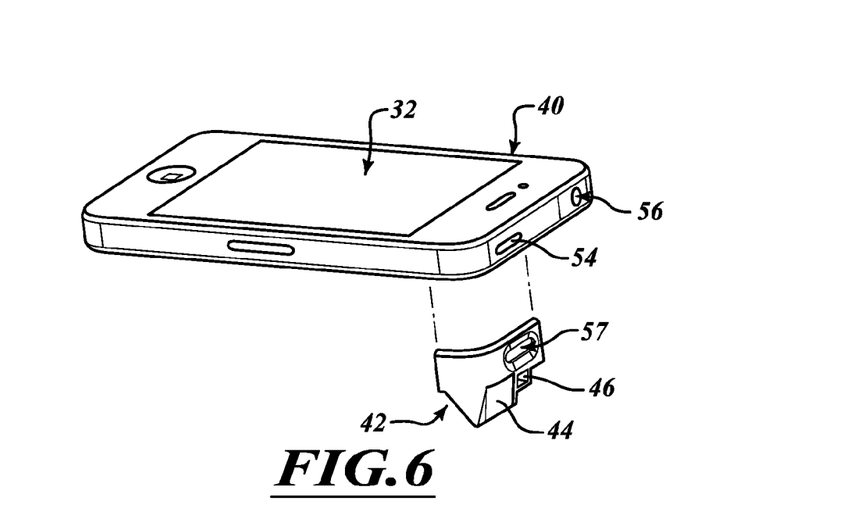
FIG. 6 is an exploded isometric view depicting the system of FIG. 5.

The image redirecting system 42 may be fixed to the case 40, such as with adhesive, fasteners, or it may be integrally molded therewith. Alternatively, the image redirecting system 42 may be configured for removable detachment to the case 40, as shown in FIGS. 5 and 6. This can be accomplished with a snap fitting or with the use of a form of mechanical coupling and uncoupling as is known in the art and will not be described in detail herein.

FIGS. 5 and 6 depict an alternative embodiment in which the redirection system 42 has the housing 48 configured for removable attachment to the case 40, such as with a snap-on structure. An opening 57 is provided for the button 54 on the device 32.

Figure 7:
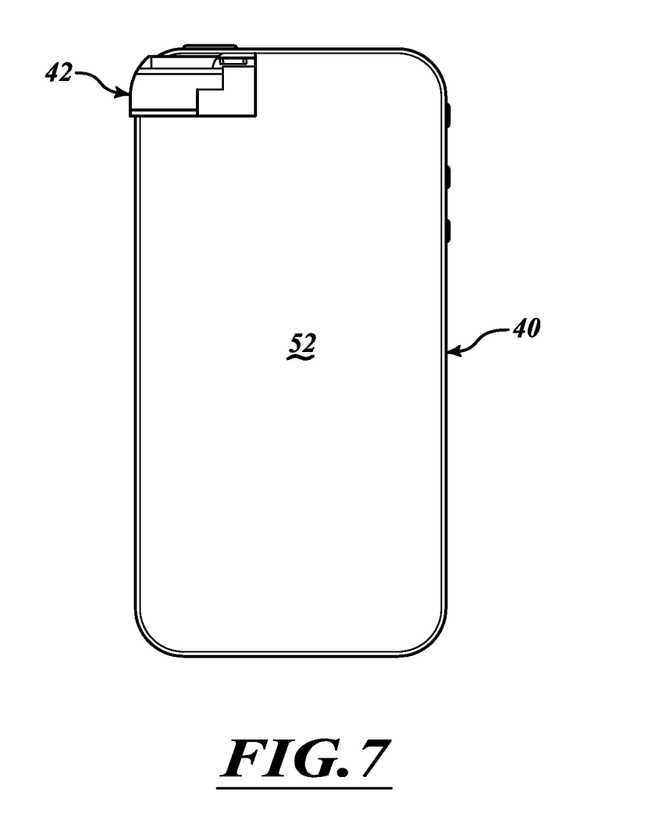
FIG. 7 is a back plan view depicting the system of FIG. 5.
Figure 8:
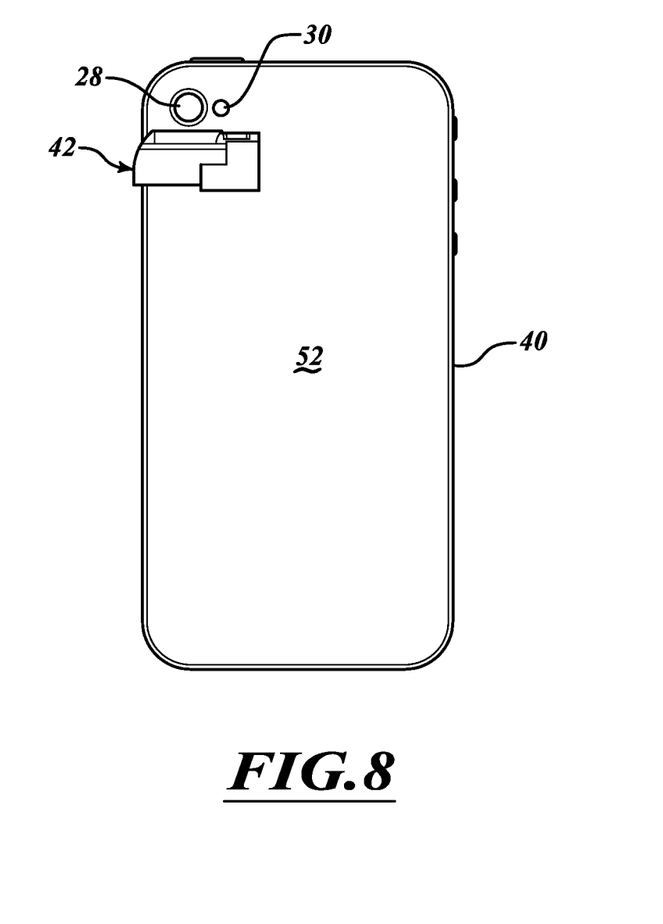
FIG. 8 is a back plan view depicting the system of FIG. 5 with the system moved to a non-deployed position by sliding the system away from the camera lens.

Another method of attachment is shown in FIGS. 7 and 8 in which the image redirecting system 42 or may be coupled to the case 40 in a manner that allows the image redirecting system 42 to be selectively configured (optically or mechanically) over the lens 28 and the flash unit 30 (deployed position or configuration), and alternatively configured so it is not mechanically or optically covering or enclosing the lens 28 and the flash unit 30 (non-deployed position or configuration). The coupling may be mechanical, electromagnetic, or any other type of linkage. Preferably the image redirecting system is slidably mounted on the case as described more fully below.

Figure 9A:
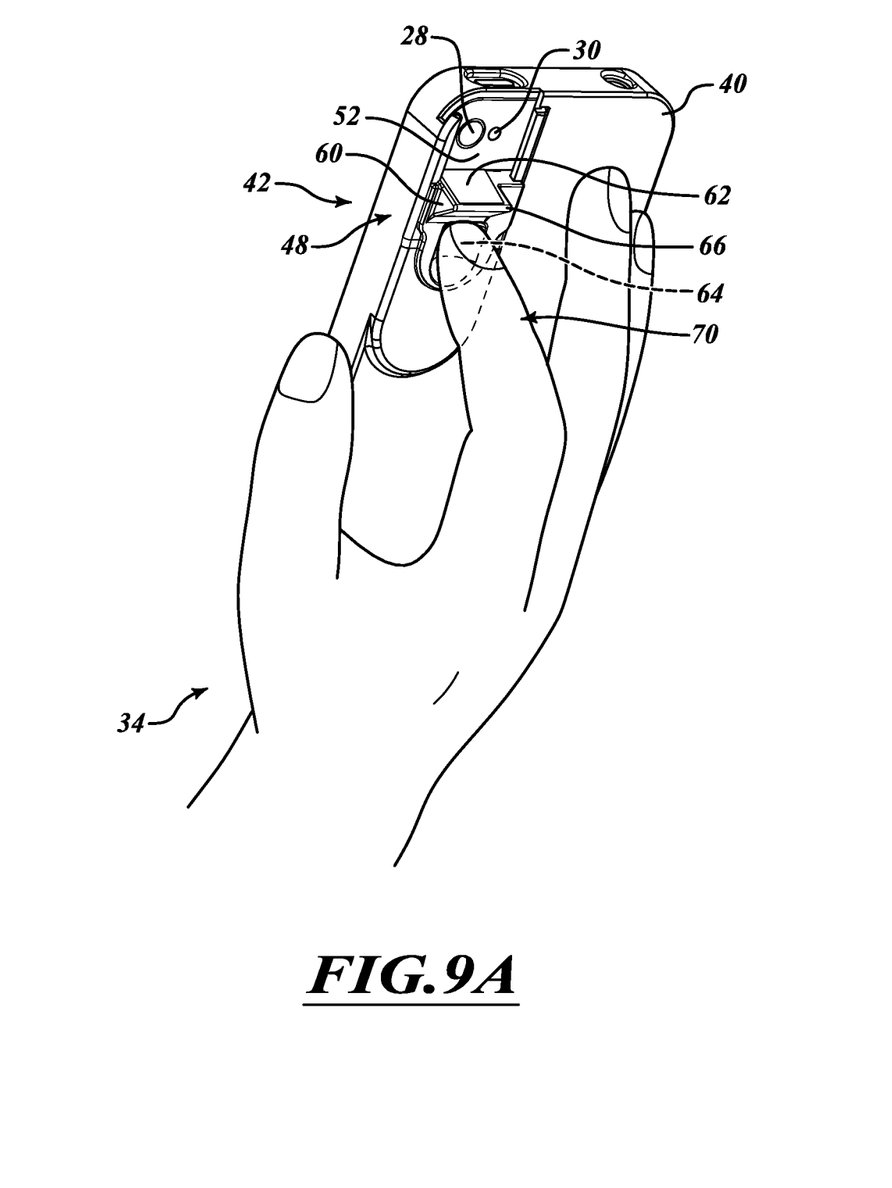
FIGS. 9A and 9B are isometric views depicting a configurable housing that is in a non-deployed position and in which the configurable housing has been placed in a deployed position by the finger of the user, respectively.
Figure 9B:
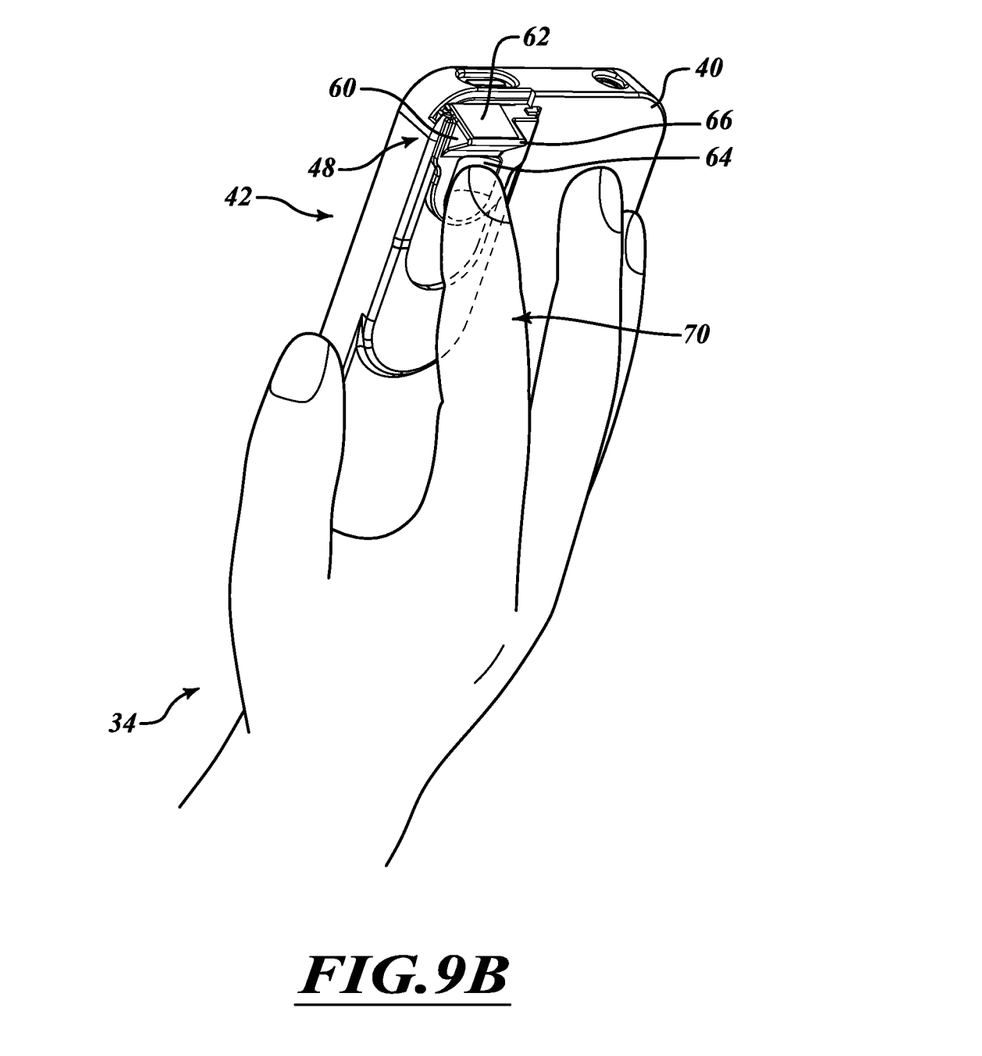

The manipulation of the configurable image redirecting system shown in FIGS. 7 and 8 is preferably controlled by the user 34 using only one finger while the rest of that hand of the user 34 braces the case 40 or the device 20. Thus, the user 34 need only use a single finger to deploy and retract the image redirecting system 42 while still holding the mobile device 20 solely with the one hand as shown in FIGS. 9A and 9B.

More particularly, the external shape of the image redirecting system 42 is configured to enable single finger manipulation by the user 34. In the example configuration shown in FIGS. 9A and 9B, the image redirection system housing 48 is generally shaped to have planar triangular sides 60, a rectangular front face 62, a base that is adjacent the back 52 (not visible), and a concave rectangular top surface 64. The edges of the housing 48 not adjacent to the backing may be smooth or be rounded and may include rounded corners to facilitate insertion into and removal of the case 40 out of a user's pocket on clothing or a protective case. Additionally, the peak 66 of the housing furthest from the backing 52 may also be rounded to further assist in placement in a pocket. The concave top 64 side of the housing 48 has a depression that is configured to receive the user 34's finger 70 to aid in manipulation of the position of the housing 48. It is to be understood that this configuration can be built into the housing 48 shown in FIGS. 2 and 3 where a movable housing is used.

The single finger control of the housing 48 enables the user 34 to deploy and retract the image redirecting system 42 (as shown in FIGS. 7 and 8, respectively) and to operate the built-in camera 22 using only one hand. The device 20 may rest in or be cradled by the palm of the user's hand while image capture is occurring, allowing the finger of the single hand of the user 34 freedom to manipulate the position of the lens redirecting system 42 and allowing the user's thumb to control the built-in camera 22 of the device 20.

The case 40 is sized and shaped to enable the device 20 to be inserted into the case 40 with a tight fit and with the user interface side 26 and touchscreen 32 accessible through the opening 50 in the case 40. As such, the front side 24 is adjacent to the backing 52 of the case 40. The buttons of the device 20 are accessible through openings for buttons 54 and the input/output ports of the device 20 are accessible through the openings for input/output ports 56. The case may be secured to the device 20 by a resilient clamping force of the lip 58, a resilient clamping force of the sides, a magnetic force, an adhesive, a mechanical fastening or coupling, or combination of the foregoing or by any other means for securing the device 20 in the case 40.

In one embodiment the lens optical element 44 uses total internal reflection to redirect the field of view 38 of the camera lens 28 such that the device 20 may optically focus on images at angles other than orthogonal with a line of sight of the lens 28. The flash optical element 46 redirects the angle of the flash illumination (not shown) so as to illuminate an object within the redirected field of view 38. In an alternative embodiment the refraction of light by the lens optical element 44 provides an imaging effect, such as wide-angle viewing or fish-eye viewing. The housing 48 may be configured to redirect the light from any side of the case 40 either in an initial configuration or with a configurable direction system.

The lens redirecting system 42 may include a means to reconfigure the direction of the field of view 38. In one embodiment, the reconfiguration is accomplished by the lens optical element 44 being adjustable in shape or position or both relative to the lens 28. The lens optical element 44 may be given freedom to rotate around the line of sight of the lens 28, i.e., around the optical axis of the lens 28. Rotation of the lens optical element 44 around the line of sight or optical axis of the lens 28 would facilitate the device 20 being held in portrait, landscape, or any orientation within the plane including portrait and landscape orientations.

The lens optical element 44 may also or alternatively be given freedom to rotate through a range of angles. The reconfiguration of the lens optical element 44 enables adjustment in the orientation of the field of view 38 between about 1 degree to and including 90 degrees into the lens 28 measured from the line of sight or optical axis of the lens 28. The redirection off the line of sight or optical axis of the lens 28 can be done with one handed operations as previously discussed.

Figure 13A:
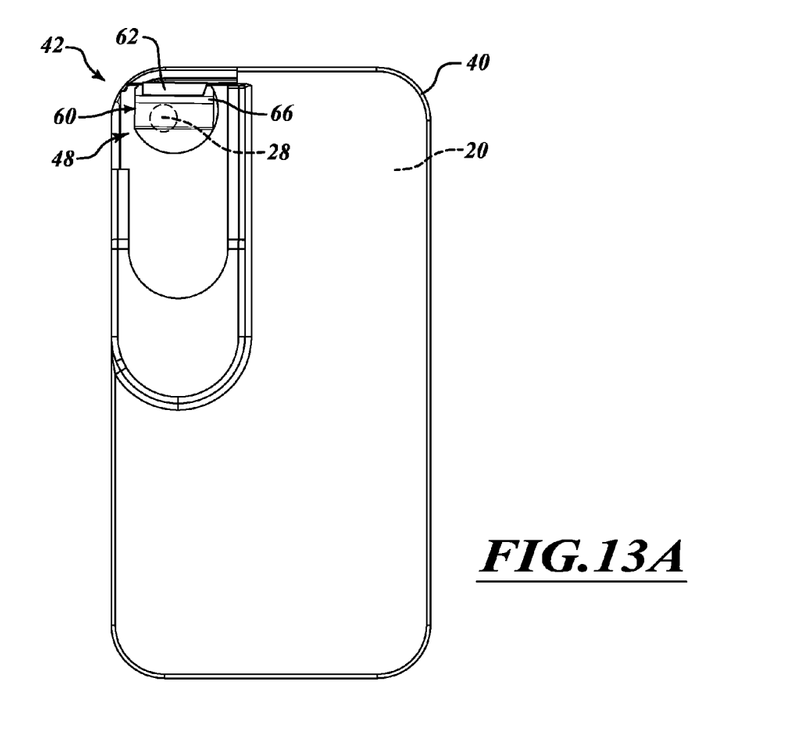
FIGS. 13A-13D illustrate various orientations of the redirecting lens relative to the mobile device lens.
Figure 13B:
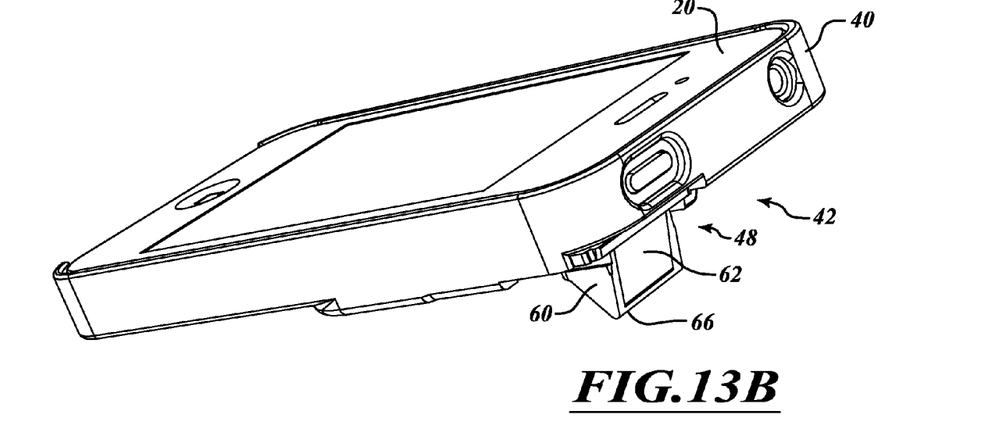
Figure 13C:
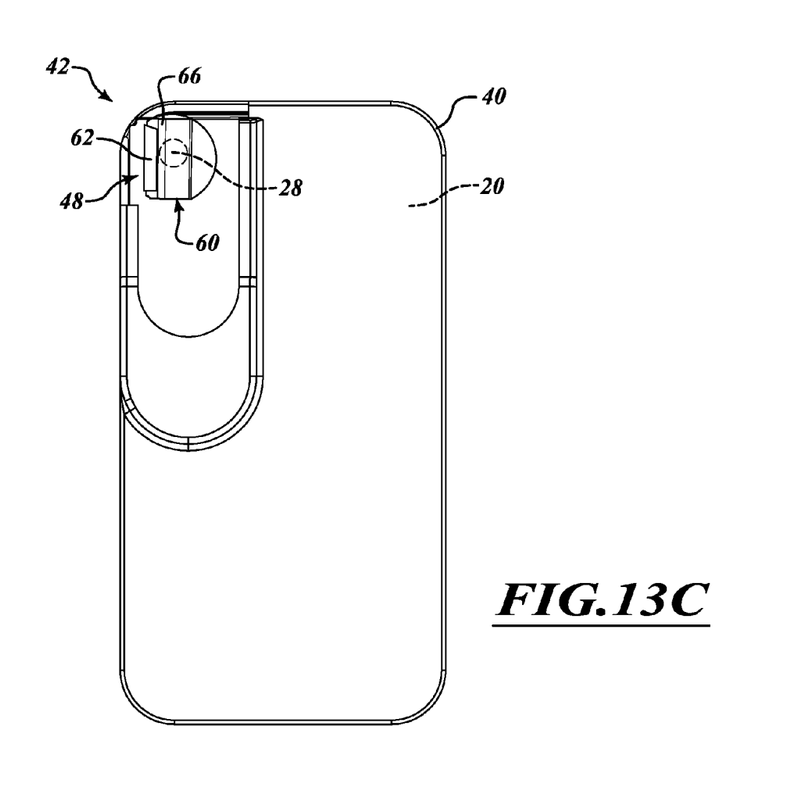
Figure 13D:
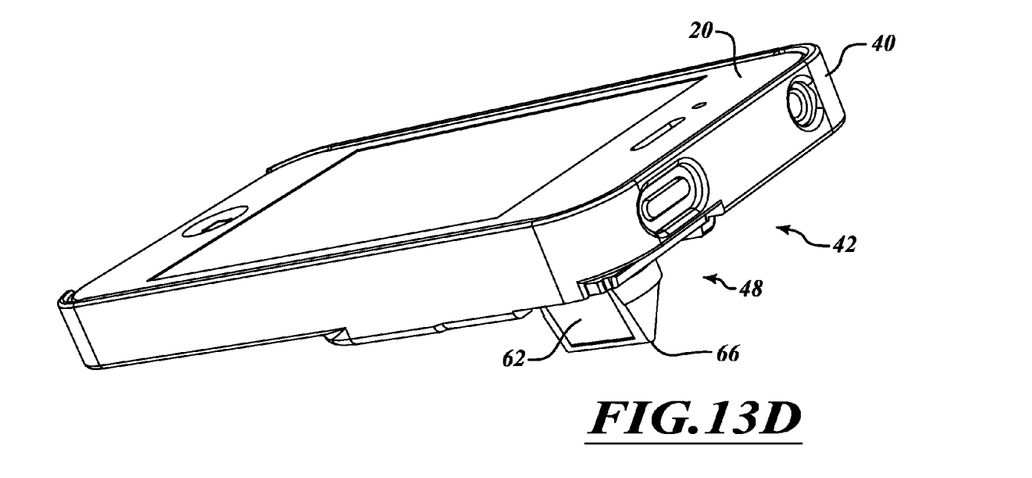

Similar to the foregoing description, the lens redirecting system 42 may be reconfigurable through the manipulation of the housing 48 instead of the lens optical element 44. As shown in FIGS. 13A-13D, the housing 48 may be given freedom to rotate around the line of sight or optical axis of the lens 28 from a forward orientation (FIGS. 13A-13B) to a 90 degree rotation (FIGS. 13C-13D). Rotation of the housing 48 around the line of sight of the lens 28 would facilitate the device 20 being held in portrait, landscape, or any orientation within the plane. For example, in FIGS. 13A-13B, the housing 48 is shown in a forward facing orientation, while in FIGS. 13C-13D the housing 48 is shown in a 90 degree counterclockwise orientation when viewed from above the back surface of the housing 48. The housing 48 may also or alternatively be given freedom to rotate through a range of angles.

The reconfiguration of the housing 48 to point off the line of sight or optical axis of the lens 28 enables adjustment in the orientation of the field of view 38 from about 1 degree to and including 90 degrees into the lens 28 measured from the line of sight or optical axis of the lens 28. The redirection the housing 48 facilitates one handed operations as previously discussed.

Figure 10:
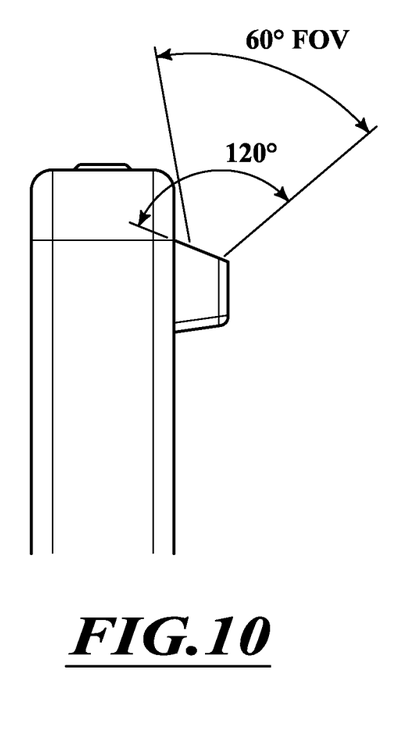
FIG. 10 is a side plan view depicting the field of view of the system of FIG. 9.

Referring next to FIG. 10, the lens redirecting system 42 is configured to redirect the image at any acute angle to the camera axis to include the largest field of view (FOV) from the mobile device camera lens. As shown in FIG. 10, it would be advantageous in some applications to design the system 42 to have an included angle less than 90 degrees so the entire FOV of the camera may be utilized.

The construction details of the present disclosure may be accomplished in several ways. Although representative configurations of a low profile lens redirecting system for use on a mobile device have been described, it is to be understood that other construction methods could also be employed. For example, the case 40 and the housing for the lens redirecting system 42 may be manufactured using one of several commercial methods including injection molding of an optical grade of plastic, bonded together with a series of lens or mirrors, precision ground optical glass, precision glass molding, or other manufacturing methods. The lenses may be made from an optical grade glass such as SCHOTT K10 or similar with a Nd: 1.50137 and Vd: 56.71 as an example.

Figure 11:
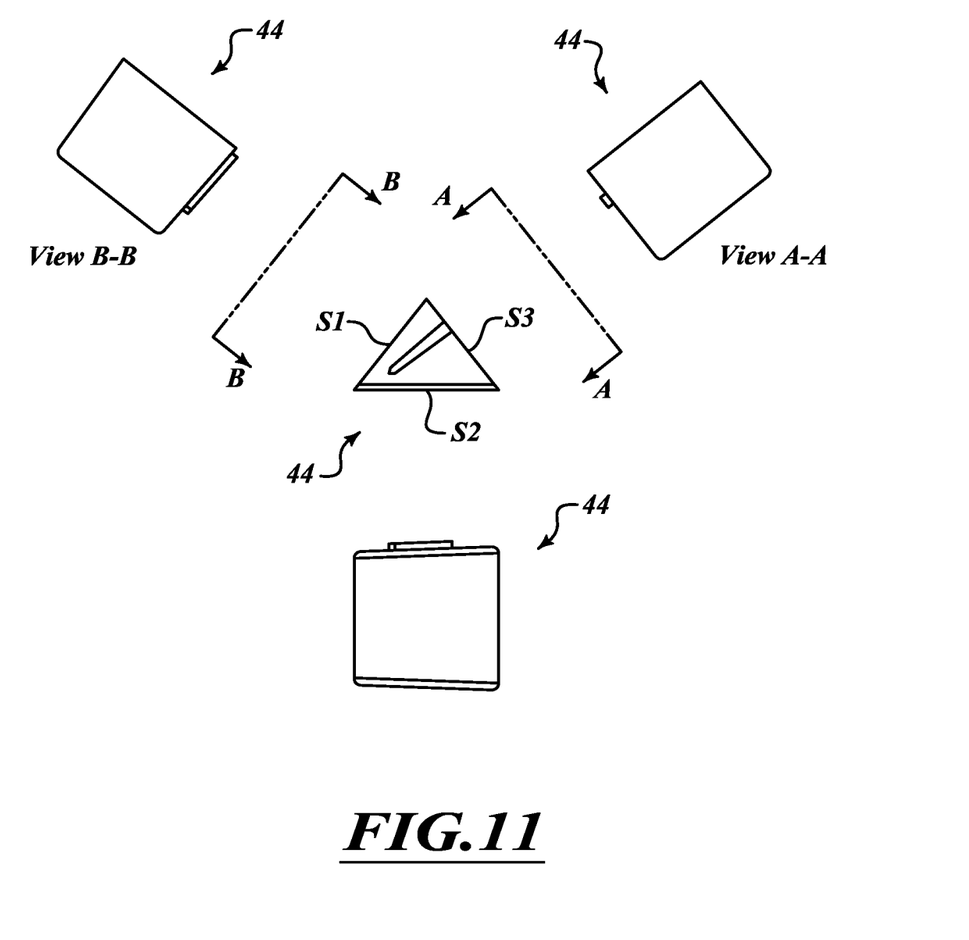
FIG. 11 is a set of illustrations showing examples of various geometries of one or more optical elements formed in accordance with the present disclosure.

FIG. 11 shows one design for the prism lens that will work for many common mobile device camera applications. An antireflective coating may be used on the surfaces S3 as shown in FIG. 11 for average reflectivity of random polarization of <1.0% at 440 nm to 650 nm over angles of incident of 0°±36°. This type of coating reduces unwanted reflections from lens surfaces. It will be appreciated that there are many possible types of coatings commercially available for this application.

Also, a high reflectivity coating can be used on surface S2 with an average reflectivity of >92% from 440 nm to 650 nm over angle of incident of 52°±23° as an example, further improves the optical qualities of the prism lens. Surface quality of surfaces S1, S2 and S3 of 60/40 are also desirable. A simple coating material could be aluminum deposited in thin layer(s) on these specified surfaces. A highly reflective surface may also be created with polished metal or other highly reflective layers.

The level of anti-reflectivity can be tuned to provide optimum lens performance. Applying multiple layers of coatings can adjust the specific reflectivity desired for a given design. By using two or more layers, broadband antireflection coatings which cover the visible range with maximum reflectivity's of less than 0.5% are commonly used. Alternatively, a series of layers with small differences in refractive index can be used to create a broadband antireflective coating by means of a refractive index gradient.

Alternately, the prism lens may be molded from an optical grade of plastic such as Cyclic Olefin Polymer (COP), Acrylic, Polycarbonate, or Polystyrene.

The optical quality and design of the system is important to minimize or eliminate optical (field curvature, barrel, pincushion distortion, and astigmatism) or chromatic aberrations in the reflected image on to the mobile device camera lens 30. Lens design as well as lens materials may be used to minimize these aberrations.

Figure 12:
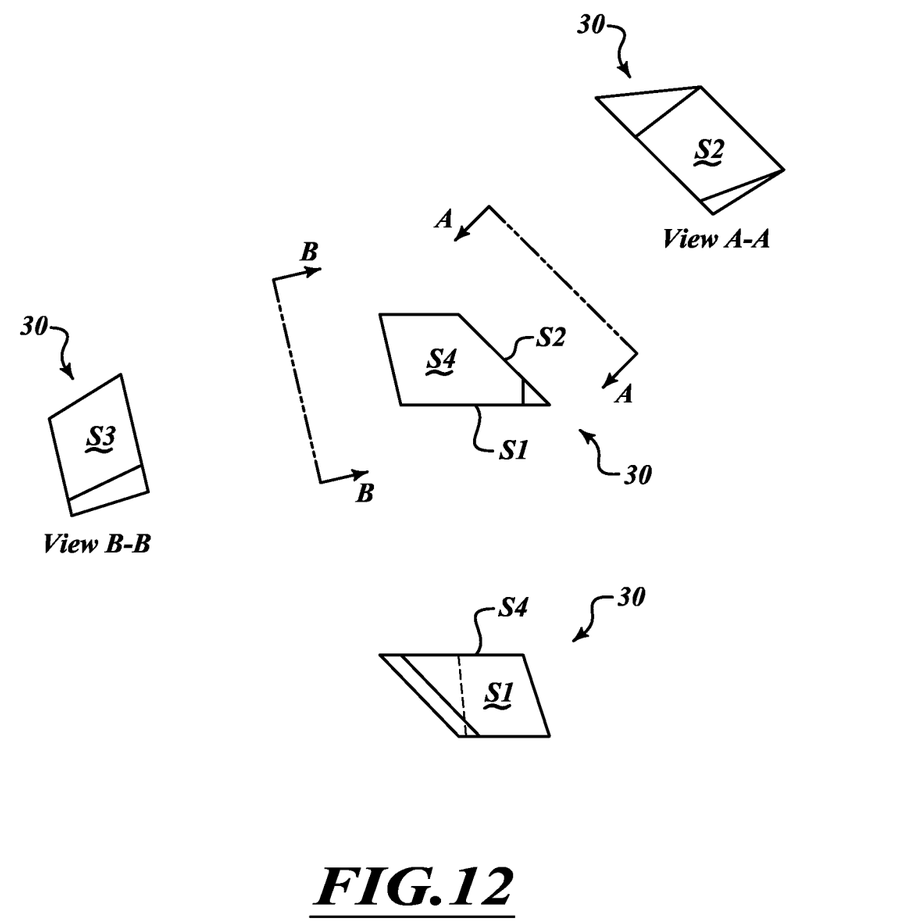
FIG. 12 is a set of illustrations showing examples of various geometries of the one or more optical elements having isolated optical paths for the camera lens and a flash unit formed in accordance with the present disclosure.

The material and finish of the flash lens 30 may be similar or identical to the lens. The coating specifications may be identical as well. As shown in FIG. 12, the flash lens 30 should have antireflective coatings on surface S4, and high reflectivity coating on surfaces S2 and S3. Surfaces S1, S2, and S3 should have a finish of 60/40.

The design of the present system has several advantages over existing products. It allows for a low height lens system that may remain attached to a mobile device for use at any time. This is significantly better than existing design for acute angle lens systems that are large and bulky and generally cannot remain in position on a mobile device sue to their awkward size. In addition, this design provides for the use of the built in camera flash on those mobile devices so equipped. Furthermore, this design provides a very low cost of manufacturing that allows for more widespread use. Also, this design may be incorporated into the mobile device in a variety of ways as shown previously. It can be formed as part of the device protective or decretive case; it can be used as a clip on accessory it can also be attached by itself to either a front or rear facing mobile device camera.

The various embodiments described above can be combined to provide further embodiments. Aspects of the embodiments can be modified, if necessary to employ concepts of the various patents, applications and publications to provide yet further embodiments. For example, the image redirecting lens could be configured to be placed over the rear side (26) as well as the front side (22) for mobile devices that have the camera lens on the user interface side.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A case for a mobile device having a camera with a lens and a flash unit, the case comprising:

a body configured to removably attach to the mobile device;

at least one optical elements configured to redirect light; and an optical housing on the body, the optical housing configured enclose the at least one optical element and to selectively position the at least one optical element over the mobile device lens when the case is attached to the mobile device to redirect light from outside the optical housing to the camera lens, the optical housing further comprising a projection configured to enable a user to grasp the camera with only one hand and to manipulate the camera and the at least one optical element with a single digit of the one hand that holds the case selectively move the at least one optical element between a first position, in which the at least one optical element is at an angle to the mobile device and positioned over the mobile device lens to redirect light from the outside of the optical housing to the camera lens, and a second position, in which the at least one optical element remains at the angle to the mobile device but is not positioned over the camera lens and does not redirect light from the outside of the optical housing to the camera lens.

2. The case of claim 1, wherein the at least one optical element includes one or more transparent prisms.

3. The case of claim 1, wherein the at least one optical element includes one or more light pipes.

4. The case of claim 1, wherein the at least one optical element is configured to alter the image projected on the lens for a photo imaging effect.

5. The case of claim 1, wherein the at least one optical element is configured to optically isolate the camera lens and the flash unit on the mobile device.

6. The case of claim 5, wherein the at least one optical element comprises a first optical element configured to refract light entering the lens at an angle in the range from about 1 degree to and including 90 degrees and a second optical element configured to refract light leaving the optical housing from a flash unit at an angle in the range from about 1 degree to and including 90 degrees.

7. The case of claim 1, wherein the optical element is configured to have an orientation between the optical element and the mobile device camera lens manipulated by the digit of the user's hand that holds the case.

8. The case of claim 1, wherein the optical element is configured to rotate around an axis transverse to a plane of the body.

9. The case of claim 1, wherein the optical housing has a sliding mechanism configured to enable the user's digit to slide the optical element into a first position over the camera lens and into a second position that is not over the camera lens.

10. The case of claim 9, comprising an alignment controller configured to align the optical housing by forcing the optical housing into the first position or the second position.

11. The case of claim 9, wherein the optical housing includes a detent mechanism configured to secure the optical housing into the first position or the second position.

12. The case of claim 9, wherein the optical housing is configured to rotate around an optical axis of the camera lens.

13. The case of claim 1, wherein the optical housing is configured to be removable from the body for storage, portability or reconfiguration.

14. The case of claim 1 wherein the body and the optical housing are sized and shaped to have a low profile in which the optical housing has a height in the range of 8-14 mm.

15. An apparatus for a mobile device having a camera with a lens and flash unit, the apparatus comprising:

a body configured to removably attach to the mobile device;

a contoured housing on the body, the contoured housing having side walls and a top wall coupled to the side walls, and configured to allow light to pass from an exterior of the apparatus to the lens, the top wall configured to receive a digit on a user's hand to enable a user to brace the body against the user's hand to facilitate one-handed operation of the mobile device; and an optical element associated with the contoured housing and configured to redirect light from the exterior of the contoured housing to the lens of the mobile device, the optical housing configured to be operated to selectively move the optical element between a first position, in which the optical element is at an angle to the mobile device and positioned over the mobile device lens to redirect light from the outside of the optical housing to the camera lens, and a second position, in which the optical element remains at the angle to the mobile device but is not positioned over the camera lens and does not redirect light from the outside of the optical housing to the camera lens.

16. The apparatus of claim 15, wherein the top wall of the contoured housing is convex and sized and shaped to receive only the single digit of the user's hand.

17. The apparatus of claim 16, wherein the convex top wall of the contoured housing is textured to provide friction for the single digit of the user's hand.

18. The apparatus of claim 15, wherein the optical element is configured to optically isolate the camera lens and the flash unit on the mobile device.

19. The apparatus of claim 15, wherein an orientation of the optical element with respect to the mobile device camera lens can be manipulated by the digit of the user's hand that holds the case.

20. The apparatus of claim 15, wherein the contoured housing has a sliding mechanism configured to enable the user's digit to slide the optical element into a first position over the camera lens and into a second position that is not over the camera lens.

21. The apparatus of claim 15, wherein the contoured housing is configured to be removed from the body for storage, portability or reconfiguration.

22. The apparatus of claim 15, wherein the optical element refracts light entering the contoured housing at an angle in the range from about 1 degree to and including 90 degrees into the lens.

23. A system, comprising:

a mobile device having a camera, a lens and a flash unit; and a case comprising:

a body configured to removably attach to the mobile device;

at least one optical element; and an optical housing on the body and configured to position the at least one optical element over the mobile device lens when the case is attached to the mobile device, the optical housing further comprising a projection configured to enable a user to hold the camera with a single hand and to manipulate the camera and the at least one optical element with a single digit of the single hand that holds the case to selectively move the at least one optical element between a first position, in which the at least one optical element is at an angle to the mobile device and positioned over the mobile device lens to redirect light from the outside of the optical housing to the camera lens, and a second position, in which the at least one optical element remains at the angle to the mobile device but is not positioned over the camera lens and does not redirect light from the outside of the optical housing to the camera lens.

24. The system of claim 23, wherein the housing includes a top wall that is convex and sized and shaped to receive only the single digit of the user's hand.

25. The system of claim 24, wherein the convex top wall of the contoured housing is textured to provide friction for the single digit of the user's hand.

26. The system of claim 23, wherein the at least one optical element is configured to optically isolate the camera lens and the flash unit on the mobile device.

27. The system of claim 23, wherein the at least one optical element is configured to have an orientation between the at least one optical element and the mobile device camera lens changed by the digit of the user's hand that holds the case.

28. The system of claim 23, wherein the optical housing has a sliding mechanism configured to enable the user's digit to slide the at least one optical element into a first position over the camera lens and into a second position that is not over the camera lens.

29. The system of claim 23, wherein the optical housing is configured to be removed from the body for storage, portability or reconfiguration.

30. The system of claim 23, wherein the at least one optical element refracts light entering the optical housing at an angle in the range from about 1 degree to and including 90 degrees into the lens.

31. The system of claim 23 wherein the optical housing encloses the at least one optical element.

* * * * *